(12) United States Patent
Mack et al.

(10) Patent No.: US 10,673,050 B2
(45) Date of Patent: Jun. 2, 2020

(54) BATTERY MODULE TERMINAL SYSTEM AND METHOD

(71) Applicant: CPS Technology Holdings LLC, New York, NY (US)

(72) Inventors: Robert J. Mack, Milwaukee, WI (US); Richard M. DeKeuster, Racine, WI (US); Michael L. Thompson, East Troy, WI (US); Jonathan P. Lobert, Hartford, WI (US); Edward J. Soleski, Mequon, WI (US)

(73) Assignee: CPS Technology Holdings LLC, New York, NY (US)

( * ) Notice: Subject to any disclaimer, the term of this patent is extended or adjusted under 35 U.S.C. 154(b) by 225 days.

(21) Appl. No.: 14/620,113

(22) Filed: Feb. 11, 2015

(65) Prior Publication Data

US 2016/0197328 A1    Jul. 7, 2016

Related U.S. Application Data

(60) Provisional application No. 62/099,976, filed on Jan. 5, 2015.

(51) Int. Cl.
*H01M 2/20* (2006.01)
*H01M 2/30* (2006.01)

(52) U.S. Cl.
CPC .............. *H01M 2/206* (2013.01); *H01M 2/30* (2013.01); *H01M 2220/20* (2013.01)

(58) Field of Classification Search
CPC ........ H01M 2/206; H01M 2/30; H01M 2/305; H01M 2/307; H01H 2085/0555; H01H 2085/025; H01H 85/044; H01H 85/12; H01H 85/143; H01H 85/2045
See application file for complete search history.

(56) References Cited

U.S. PATENT DOCUMENTS

| 5,713,707 A | 2/1998 | Gagnon |
| 6,280,263 B1 | 8/2001 | Manor et al. |
| 6,902,434 B2 | 6/2005 | Stack |

(Continued)

FOREIGN PATENT DOCUMENTS

| CN | 101952994 A | 1/2011 |
| CN | 102057519 A | 5/2011 |

(Continued)

OTHER PUBLICATIONS

PCT/US2015/059885 International Search Report and Written Opinion dated Feb. 5, 2016.

(Continued)

*Primary Examiner* — Stephen J Yanchuk
(74) *Attorney, Agent, or Firm* — Boardman & Clark LLP

(57) ABSTRACT

The present disclosure includes a battery module that includes an electrochemical cell having a minor terminal. The battery module also includes a major terminal electrically coupled to the electrochemical cell, wherein the major terminal includes a base and a post extending from the base. Further, the battery module includes an electrical path between the minor terminal of the electrochemical cell and the major terminal of the battery module. The electrical path includes a bus bar having an opening that receives the post of the major terminal and a pocket that retains the base of the major terminal.

17 Claims, 12 Drawing Sheets

(56) References Cited

U.S. PATENT DOCUMENTS

| | | |
|---|---|---|
| 8,033,875 B1 | 10/2011 | Maguire |
| 8,235,732 B2 | 8/2012 | Garascia et al. |
| 10,056,599 B2 * | 8/2018 | Kato .................... H01R 11/283 |
| 2011/0294367 A1 * | 12/2011 | Moon ................. H01M 2/0473 |
| | | 439/878 |
| 2012/0293295 A1 | 11/2012 | Kibushi et al. |
| 2013/0095374 A1 * | 4/2013 | Kim ....................... H01M 2/30 |
| | | 429/179 |
| 2013/0095696 A1 | 4/2013 | Matsumura et al. |
| 2013/0288530 A1 | 10/2013 | Zhao |
| 2014/0154567 A1 * | 6/2014 | Nishida .................. H01M 2/06 |
| | | 429/211 |
| 2016/0218401 A1 * | 7/2016 | Hermann .......... H01M 10/6554 |

FOREIGN PATENT DOCUMENTS

| | | |
|---|---|---|
| CN | 102741963 A | 10/2012 |
| CN | 103718333 A | 4/2014 |
| EP | 0003289 B1 | 8/1982 |

OTHER PUBLICATIONS

EP 15805656.4 Communication Pursuant to Article 94(3) dated Sep. 18, 2018.

* cited by examiner

BATTERY MODULE TERMINAL SYSTEM AND METHOD

CROSS-REFERENCE TO RELATED APPLICATION

This application claims priority from and the benefit of U.S. Provisional Application Ser. No. 62/099,976, filed Jan. 5, 2015, entitled "Battery Module Terminal System and Method," which is hereby incorporated by reference in its entirety for all purposes.

BACKGROUND

The present disclosure relates generally to the field of batteries and battery modules. More specifically, the present disclosure relates to a bus bar and a terminal for lithium-ion (Li-ion) battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include a number of interconnected electrochemical cells coupled together via bus bars (e.g., minor bus bars) extending between terminals (e.g., minor terminals or cell terminals) of the electrochemical cells. Further, the battery module may include two major terminals electrically coupled with the interconnected electrochemical cells via corresponding electrical paths, each electrical path having a major bus bar extending from the major terminal between the major terminal and the minor terminal of one of the electrochemical cells. This enables the two major terminals to be coupled to a load for powering the load via electric power provided by the interconnected electrochemical cells. In traditional configurations, each major bus bar and corresponding major terminal of the battery module may be welded together to establish at least a portion of the electrical path between the major terminal and the minor terminal, which may require that the major bus bar and the major terminal are made of the same material, or at least compatible materials for welding. The welding steps and use of specific materials may result in a high cost of the battery module. Further, traditional configurations requiring extensive welding may be bulky, which may reduce an energy density of the battery module. Accordingly, it is now recognized that an improved major bus bar and major terminal (and assembly thereof) for battery modules is needed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery module that includes an electrochemical cell having a minor terminal. The battery module also includes a major terminal electrically coupled to the electrochemical cell, wherein the major terminal includes a base and a post extending from the base. Further, the battery module includes an electrical path between the minor terminal of the electrochemical cell and the major terminal of the battery module. The electrical path includes a bus bar having an opening that receives the post of the major terminal and a pocket that retains the base of the major terminal The present disclosure also relates to a method of manufacturing a battery module that includes disposing a post of a module terminal through an opening in a bus bar. The method also includes wrapping a first extension of the bus bar from a first surface of a base of the module terminal to a second surface of the base opposite to the first surface.

The present disclosure also relates to a battery module that includes a first electrochemical cell having a first terminal, a second electrochemical cell having a second terminal, and one or more intermediate electrochemical cells electrically connected between, and to, the first electrochemical cell and the second electrochemical cell. The battery module includes a first electrical path extending between the first terminal of the first electrochemical cell and a first major terminal of the battery module and comprising a first major bus bar. The first major terminal includes a first post that extends through a first opening in the first major bus bar, and a first base that is coupled to the first post and retained within a first pocket of the first major bus bar at least partially defined by one or more first extensions of the first major bus bar that wrap around the first base of the first major terminal The battery module further includes a second electrical path extending between the second terminal of the electrochemical cell and a second major terminal of the battery module and comprising a second major bus bar. The second major terminal includes a second post that extends through a second opening in the second major bus bar, and a second base that is coupled to the second post and retained within a second pocket of the second major bus bar at least partially defined by one or more second extensions of the second major bus bar that wrap around the second base of the second major terminal

DRAWINGS

Various aspects of this disclosure may be better understood upon reading the following detailed description and upon reference to the drawings in which.

DETAILED DESCRIPTION

Figure 1:
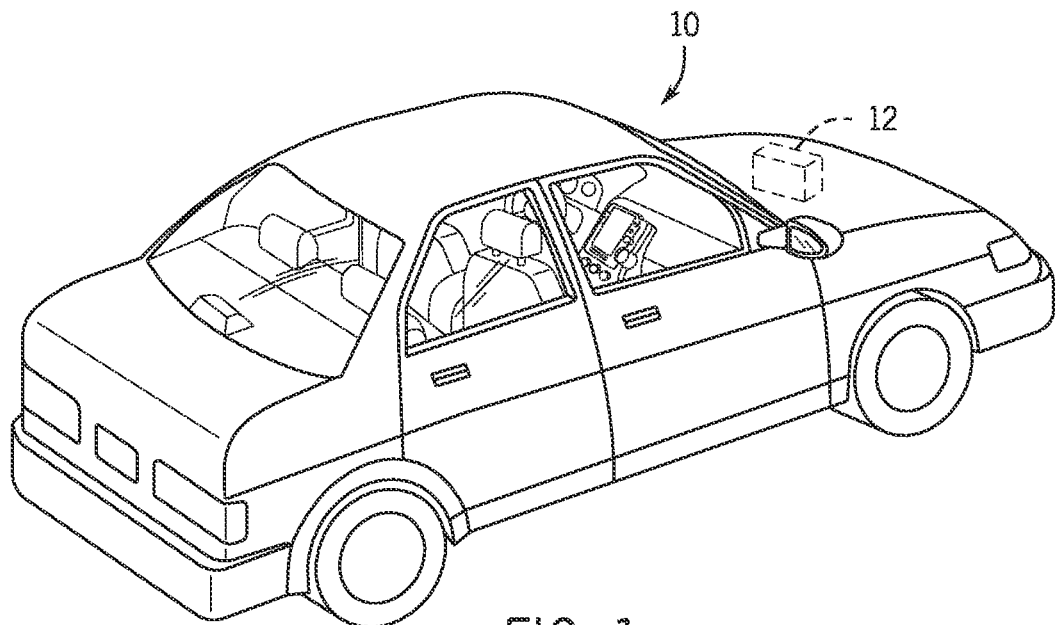
FIG. 1 is a perspective view of a vehicle having a battery system configured in accordance with present embodiments to provide power for various components of the vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

During assembly of a battery module, the individual electrochemical cells may be positioned in a housing of the battery module, and terminals (e.g., minor terminals or cell terminals) of the electrochemical cells may extend generally away from the housing. To couple the electrochemical cells together (e.g., in series or parallel), an electrical path between minor terminals of two or more electrochemical cells may be established by coupling pairs of minor terminals via corresponding bus bars (e.g., minor bus bars). Further, two of the electrochemical cells (e.g., on either end of the battery module or on ends of one or more stacks of electrochemical cells) may be electrically coupled to major terminals (e.g., module terminals or primary terminals) of the battery module via corresponding major bus bars, or via corresponding major bus bar assemblies, where the major terminals are configured to be coupled to a load for powering the load. In traditional configurations, to ensure that the major terminals and their associated major bus bars do not become decoupled, the major terminals and major bus bars may be welded together. However, welding of the major terminal and the major bus bar may require that the material of the major bus bar is the same as the material of the major terminal, or at least compatible for welding. Further, the material of the major bus bars may depend on the material of the corresponding minor terminals (e.g., of the electrochemical cells) from which the major bus bars extend, or on the material of one or more intervening components (e.g., a shunt coupled to a printed circuit board (PCB 63)). This may increase a material cost of the battery module and complexity of manufacturing. Further, associated geometries, assemblies, and welding techniques for traditional configurations such as those described above may contribute to a volume of the battery module, thereby reducing an energy density of the battery module.

To address these and other shortcomings of traditional battery module configurations, battery modules in accordance with the present disclosure include major terminals and major bus bars having similar or dissimilar materials, where the major terminals and major bus bars are coupled together without welding. For example, each major terminal (e.g., on either side of the battery module or stacks of electrochemical cells) may include a base and a post extending from the base. A corresponding major bus bar extending from the major terminal may be a flat sheet (or initially a flat sheet) with an opening configured to receive the post of the major terminal Generally, the flat sheet is capable of being wrapped around at least a portion of the major terminal (e.g., at least the base). For instance, the flat sheet of the major bus bar may include flaps extending from a body (e.g., a rectangular body) of the flat sheet. After extending the post of the major terminal through the opening in the flat sheet (which is the major bus bar), the flaps may be wrapped around the base of the major terminal to envelop or retain the base. For example, the flaps may be heated to enhance pliability and enable wrapping of the flaps around the base of the major terminal, thereby enabling the major bus bar and the major terminal to be electrically connected without negatively affecting the integrity of the major bus bar, and without welding. The flaps of the major bus bar may be stamped, pressed, or maneuvered in some other manner in place around the base of the major terminal Further, the base of the major terminal may be square or rectangular in shape (or include a square or rectangular portion), which enables resistance (e.g., via contact between the base of the major terminal and the flaps of the major bus bar wrapped around the base) to torque applied to the post of the major terminal Further still, after wrapping the flaps of the major bus bar around the base of the major terminal, a lower portion of the combined major bus bar and major terminal (e.g., lower portion including the base and the wrapped flaps) may be embedded in a wall of a plastic housing of the battery module. For example, the lower portion of the combined major bus bar and major terminal may be injection molded with the plastic housing. Accordingly, the lower portion of the combined major bus bar and major terminal may be embedded within the housing in a number of orientations, and an electrical path from the major terminal to a corresponding minor terminal of an electrochemical cell (e.g., the electrical path including the major bus bar) may be adapted and/or configured based on the orientation of the major terminal These and other features will be described in further detail below.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
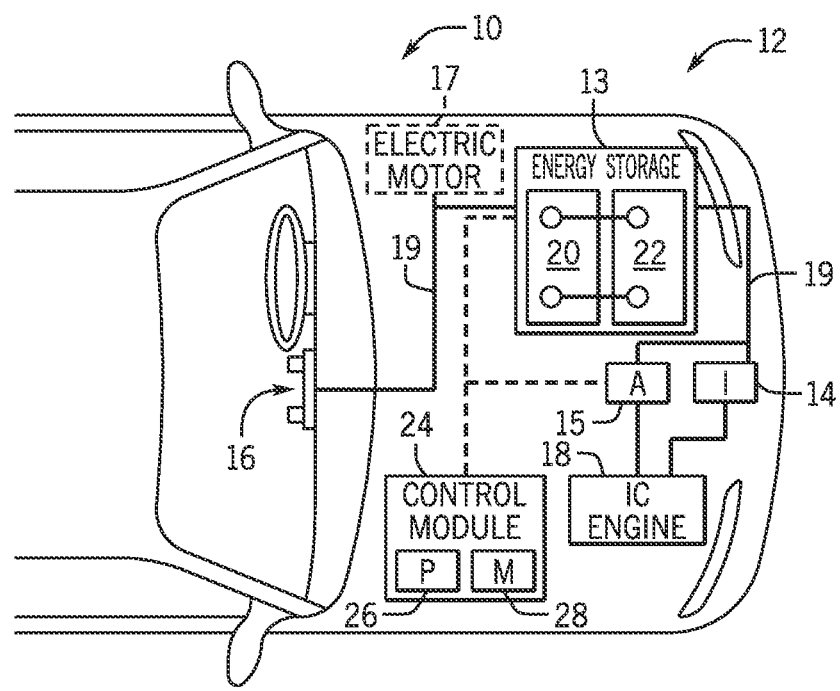
FIG. 2 is a cutaway schematic view of an embodiment of the vehicle and the battery system of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
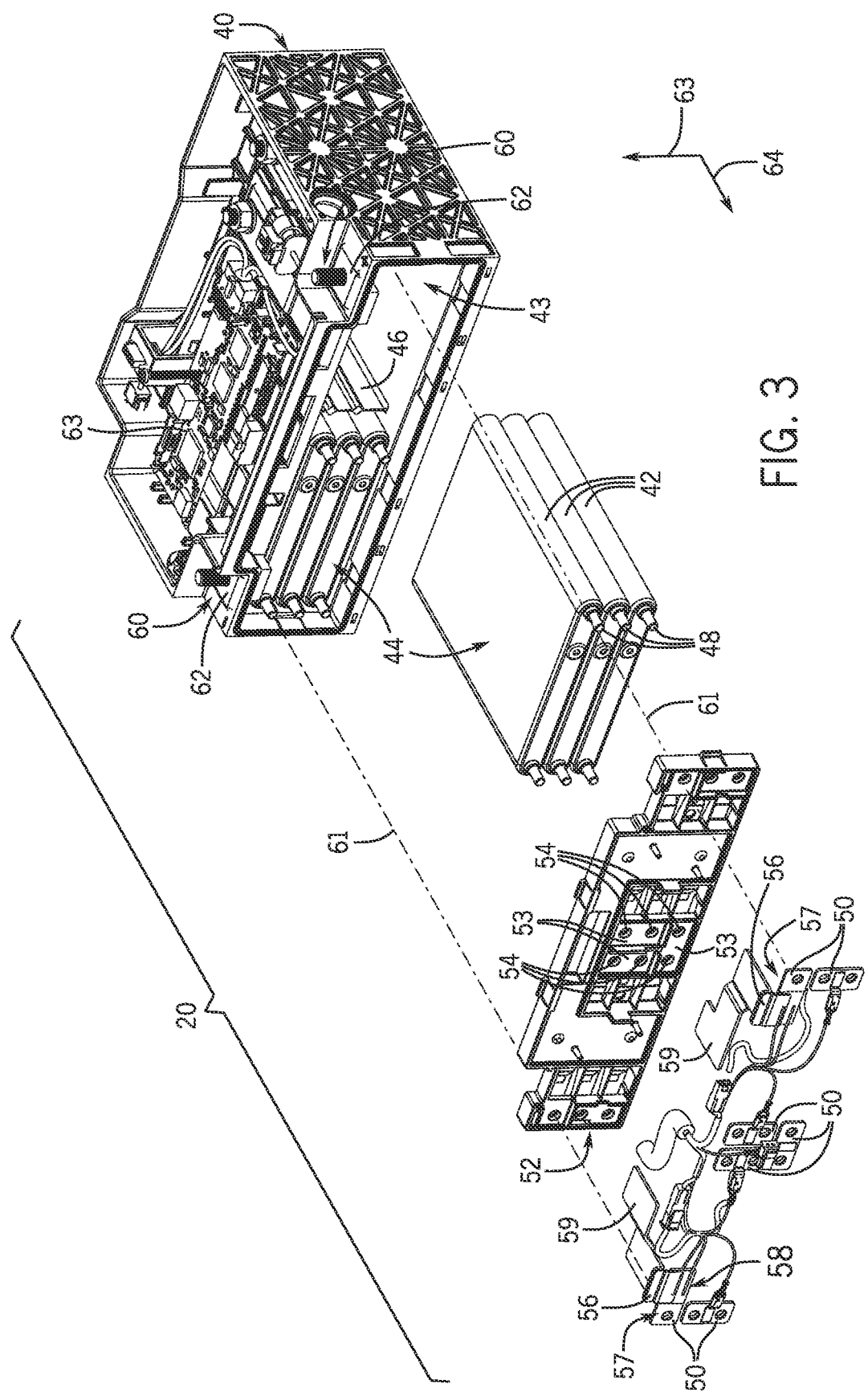
FIG. 3 is an exploded perspective view of an embodiment of a battery module for use in the vehicle of FIG. 1, in accordance with an aspect of the present disclosure.

An exploded perspective view of an embodiment of the battery module 20 (e.g., lithium-ion (Li-ion) battery module) is shown in FIG. 3. In the illustrated embodiment, the battery module 20 includes a housing 40 configured to store electrochemical cells 42 within an interior 43 of the housing 40. In the illustrated embodiment, the electrochemical cells 42 are stored in two stacks 44 within the interior 43 of the housing 40, where the two stacks 44 are separated by a partition 46. However, the electrochemical cells 42 may be housed in the interior 43 of the housing 40 in fewer or more than two stacks 44 (e.g., 1, 3, 4, 5, 6, or more stacks 44), and the electrochemical cells 42 may be oriented within the interior 43 of the housing 40 vertically, horizontally, or otherwise.

Each electrochemical cell 42 may include two terminals 48 (e.g., minor terminals or cell terminals). For clarity, the terminals 48 of the electrochemical cells 42 will be referred to herein as minor terminals 48. The minor terminals 48 of adjacent electrochemical cells 42 are coupled together in series via bus bars 50 (e.g., minor bus bars or cell bus bars). For clarity, the bus bars 50 configured to couple the minor terminals 48 of adjacent electrochemical cells 42 will be referred to herein as minor bus bars 50. In the illustrated embodiment, the minor bus bars 50 may be installed or otherwise disposed in (or on) a carrier 52 configured to hold or facilitate coupling between the minor bus bars 50 and other electrical components (e.g., voltage or temperature sensors or leads thereof). For example, the carrier 52 may include recesses 53 configured to receive the minor bus bars 50, where openings 54 are disposed in the recesses 53 for receiving the minor terminals 48 of the electrochemical cells 42. Accordingly, the minor bus bars 50 are disposed in the recesses 53 and the terminals 48 extend through the openings 54 into contact with the minor bus bars 50. In other embodiments, the minor bus bars 50 may not include the openings 54, and the terminals 48 may contact a flat surface of the minor bus bars 50.

The minor bus bars 50 establish an aggregate network of interconnected electrochemical cells 42 by coupling minor terminals 48 of adjacent electrochemical cells 42, where the aggregate network of interconnected electrochemical cells 42 enables an aggregate charge provided to charge a load. For example, electrical paths 61 may be defined on either side of the aggregate network of interconnected electrochemical cells 42, where the electrical paths 61 include terminals 60 (e.g., major terminals or module terminals) of the battery module 20 that couple with the load to supply the load with the aggregate charge from the interconnected electrochemical cells 42.

For example, in the illustrated embodiment, the electrical paths 61 each include a bridge 56, each bridge 56 being coupled to a corresponding minor bus bar 50. In some embodiments, the corresponding minor bus bar 50 may be a bi-metal bus bar having a first end 57 with a first material corresponding to a material of the minor terminal 48 in contact with the first end 57, and a second end 58 in contact with the bridge 56 and having a second material corresponding to a material of the bridge 56. This may enable a transition from the material of the terminals 48 (e.g., aluminum) to a different material (e.g., copper). The transition may facilitate the use of a shunt 59 or some other component (e.g., a relay component) that is coupled to (e.g., welded to) the bridge 56 and is in electrical communication with a printed circuit board (PCB) 63 of the battery module 20. For example, the shunt 59 may be in electrical communication with the PCB 63 via sensors and corresponding leads extending from the sensors, where the sensors provide measurements of parameters (e.g., voltage and/or temperature) monitored for control of the battery module 20. Generally, the shunt 59 and/or relay components are a certain material (e.g., copper) that enables appropriate measurement and/or sensing of voltage parameters, temperature parameters, and/or other parameters relating to operating conditions of the battery module 20. Further, in some embodiments, the shunt 59 and the bridge 56 may be one integral component.

In accordance with the present disclosure, the bridges 56 are also in electrical communication with the corresponding terminals 60 (e.g., major terminals or module terminals) of the battery module 20 to establish the corresponding electrical paths 61 between the terminals 60 of the battery module 20 and the minor terminals 48 of the electrochemical cells 42. For clarity, the terminals 60 of the battery module 20 will be referred to as major terminals 60 herein (e.g., to differentiate from the minor terminals 48 of the electrochemical cells 42). Each major terminal 60 may be partially embedded within a wall of the housing 40 of the battery module 20, along with at least a portion of a corresponding bus bar 62 (e.g., major bus bar) of the battery module 20. In some embodiments, only a portion of the corresponding bus bar 62 (e.g., major bus bar) may be embedded in the housing 40. The corresponding bus bar 62 (e.g., major bus bar) may be coupled (e.g., directly or indirectly) to the corresponding bridge 56, which is in electrical communication with the corresponding minor bus bar 50 and, thus, with the corresponding minor terminal 48 of the corresponding electrochemical cell 42. For clarity, the bus bars 62 of the battery module 20 will be referred to herein as major bus bars 62 (e.g., to differentiate from the minor bus bars 50 on the carrier 52).

Each major bus bar 62 includes portions wrapped around a base of the corresponding major terminal 60, and an opening configured to receive a post of the corresponding major terminal 60, thereby enabling the major bus bar 62 to retain the major terminal 60 without welding the two components together. In other words, the coupling between the major terminal 60 and the major bus bars 62 may be physical only, as opposed to physical and metallurgical as would be the case with welding. For example, each of the two major bus bars 62 may include one or more flaps or extensions folded and/or stamped around a base of the major terminal 60 to enable a pocket 65 proximate or between the one or more folded flaps, where the pocket 65 is configured to hold the base of the major terminal 60. Thus, while the major bus bars 62 may include a material corresponding to the material of the bridges 56 (e.g., copper) such that the major bus bars 62 may be welded to the bridges 56, the major terminals 60 may include a different material since welding between the major terminals 60 and the major bus bars 62 is not needed. The major terminal 60, for example, may include stainless steel, which facilitates reduced material cost, increased ease of manufacturing, and durability. These and other features of the major terminals 60 and the major bus bars 62 will be described in detail below.

It should be noted that the two illustrated electrical paths 61 may include additional or fewer components depending on the embodiment of the battery module 20. For example, in the illustrated embodiment, the major terminals 60 of the battery module 20 extend in direction 63. The electrical path 61 extending from the minor terminal 48 of the electrochemical cell 42 to the major terminal 60 of the battery module 20 includes the bi-metal bus bar 50, the bridge 56, and the major bus bar 62. Further, the electrical path 61 may include a portion of the shunt 59 between (e.g., sandwiched between) the bridge 56 and the major bus bar 62. However, in other embodiments, it may be desirable for the major terminals 60 to extend in a different direction, e.g., in direction 64 (e.g., the same direction as the cell terminals 48). For example, extending the major terminals 60 in a particular direction (e.g., directions 63 or 64) may facilitate ease of coupling with a load. Depending on the direction of the major terminals 60, embodiments may include more components, fewer components, or different components in the electrical path 61 to establish electrical communication between the minor terminal 48 of the electrochemical cell 42 and the major terminal 60 of the battery module 20. These and other features will be described in detail below with reference to later figures, namely, FIGS. 9 and 10.

Figure 4:
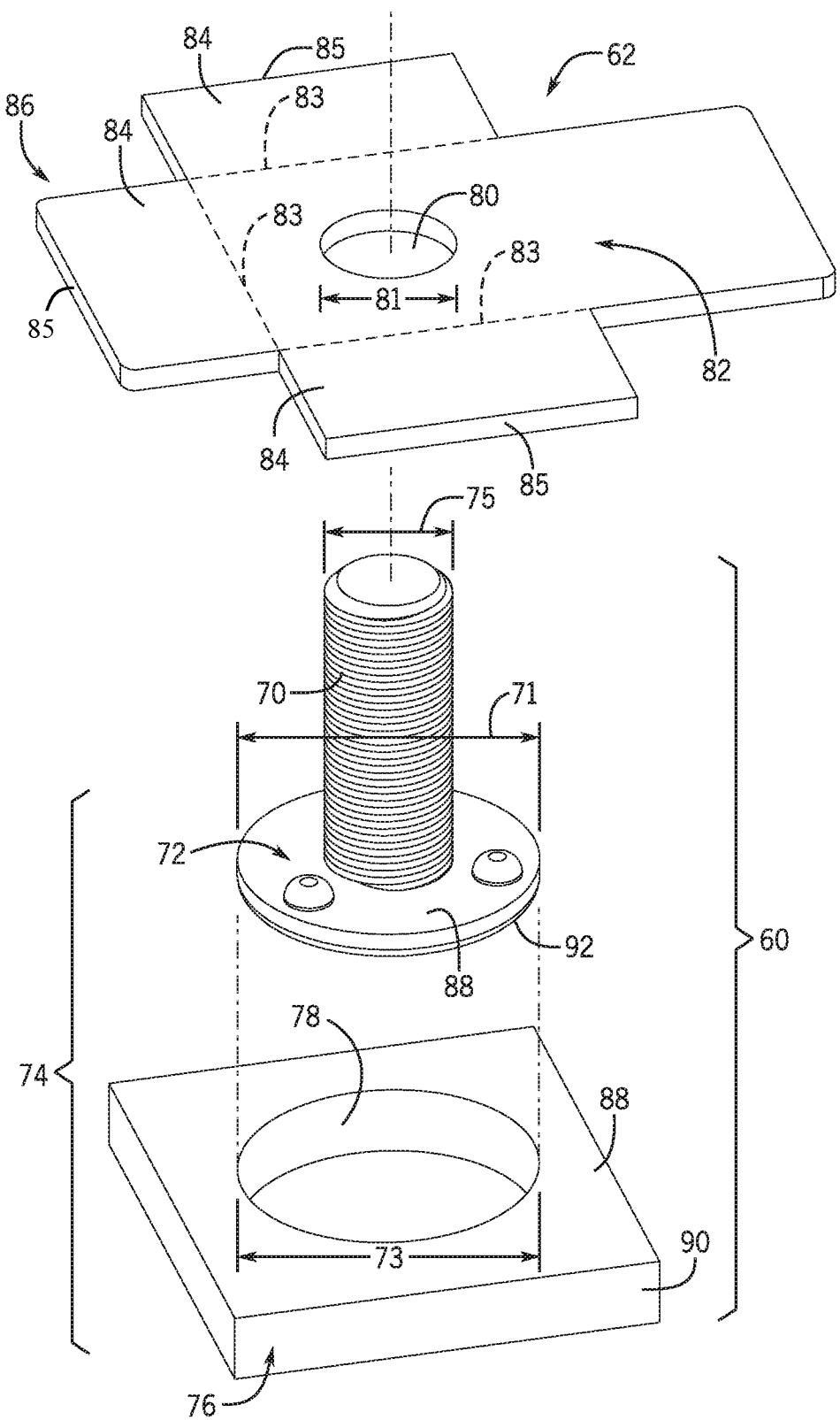
FIG. 4 is an exploded perspective view of an embodiment of a bus bar and major terminal of the battery module of FIG. 3, in accordance with an aspect of the present disclosure.

The manner in which the major terminals 60 and the major bus bars 62 are coupled together may be further appreciated with reference to FIGS. 4-8, which depict various stages of coupling the features together. Specifically, FIG. 4 is an exploded perspective view of an embodiment of one of the major terminals 60 and one of the major bus bars 62 (e.g., before or during assembly). In the illustrated embodiment, the major terminal 60 includes a post 70 extending from a cylindrical portion 72 of a base 74 of the major terminal 60. For example, the post 70 may be integrally formed with the cylindrical portion 72, or the post 70 may be otherwise coupled to the cylindrical portion 72 via adhesive, welding, one or more fasteners, or some other suitable coupling mechanism. The base 74 also includes a rectangular portion 76 with an opening 78 configured to receive the cylindrical portion 72. For example, a diameter 71 of the cylindrical portion 72 may correspond to a diameter 73 of the opening 78 in the rectangular portion 76. The cylindrical portion 72 may be coupled to the rectangular portion 76 at the opening 78 via adhesive, welding (e.g., resistance or laser welding), one or more fasteners, or some other coupling mechanism. Further, in some embodiments, the opening 78 in the rectangular portion 76 may be configured to receive the post 70 of the major terminal 74 as opposed to the cylindrical portion 72. For example, the diameter 73 of the opening 78, in another embodiment, may correspond to a diameter 75 of the post 70, and the post 70 may be coupled to the rectangular portion 76 at the opening 78 via adhesive, welding (e.g., resistance or laser welding), one or more fasteners, or some other coupling mechanism. Further still, in some embodiments, the base 74 may include only a rectangular portion coupled to (e.g., via adhesive, welding, fasteners, or any other suitable coupling method) or integrally formed with the post 70.

The major bus bar 62, before assembly, is a generally flat member that may be cut from sheet metal or formed via a cutting or casting process. The major bus bar 62, in the illustrated embodiment, includes an opening 80 configured to receive the post 70 of the major terminal 60. For example, the opening 80 may include a diameter 81 corresponding to the diameter 75 of the post 70. The opening 80 extends through a main body 82 of the major bus bar 62. The opening 80 may be cut, punched, or otherwise disposed in the main body 82 of the major bus bar 62.

The major bus bar 62 also includes flaps 84 extending from the main body 82. For example, in the illustrated embodiment, each flap 84 includes a proximal end 83 attached to, and extending from, the main body 82 through which the opening 80 of the major bus bar 62 is disposed. Further, each flap 84 includes a distal free end 85 opposite to the proximal end 83. That is, the distal free end 85 is situated along the flap 84 opposite to the point of attachment between the proximal end 83 of the flap 84 and the main body 82 of the major bus bar 62. The word "free" in "distal free end 85" is used to denote that the flap 84 terminates at the distal free end 85. Before assembly, the flaps 84 may extend generally parallel with the main body 82 of the major bus bar 62. The major bus bar 62 may include three flaps 84, as shown, or the major bus bar 62 may include less than or more than three flaps 84. For example, in some embodiments, the major bus bar 62 may only include a primary flap 86 extending from the main body 82, where the primary flap 86 and the main body 82 together form, e.g., a rectangular or square prism. In general, the flaps 84 (including the primary flap 86) of the major bus bar 62, during assembly, are folded over at least a portion of the base 74 of the major terminal 60 after the post 70 of the major terminal 60 is pushed, extended, or disposed through or in the opening 80 of the major bus bar 62 (e.g., as shown in FIG. 5).

Figure 6:
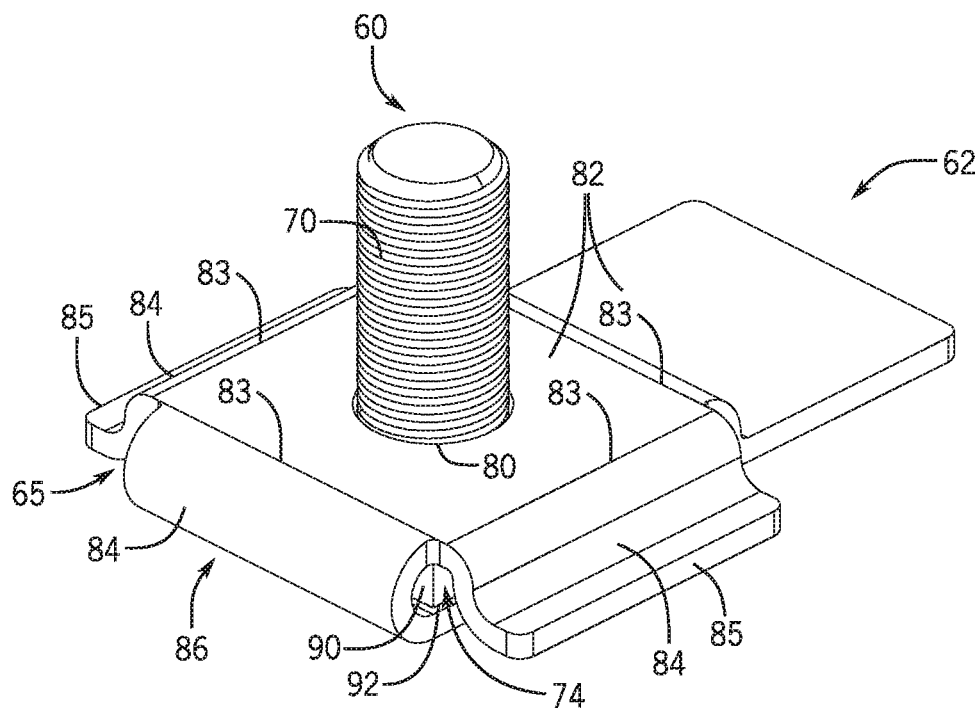
FIG. 6 is a perspective view of an embodiment of an assembly of the bus bar and the major terminal of FIG. 4, in accordance with an aspect of the present disclosure.
Figure 7:
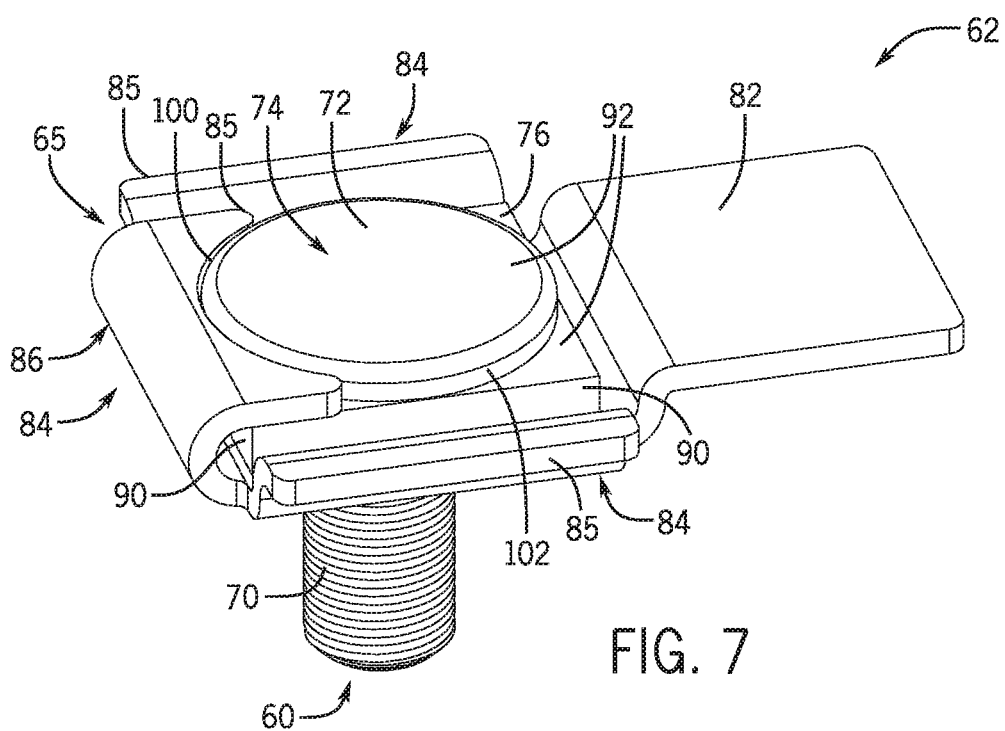
FIG. 7 is a bottom perspective view of an embodiment of the assembly of the bus bar and the major terminal of FIG. 6, in accordance with an aspect of the present disclosure.

For example, the flaps 84 may be folded from or proximate a top surface 88 of the base 74 around or proximate a side surface 90 of the base 74. One or more of the flaps 84 (e.g., the primary flap 86) may also fold under a bottom surface 92 of the base 74. The top and bottom surfaces 88, 92 may extend across both the cylindrical and rectangular portions 72, 76 of the base 74, and the side surfaces 90 may extend between the top and bottom surfaces 88, 92 along the rectangular portion 76 of the base 74. As a result of this folding, the flaps 84 (and a portion of the main body 82), form the pocket 65 configured to retain the base 84 (e.g., as shown in FIGS. 6 and 7). Because the base 84 includes the rectangular portion 76, torque applied to the post 70 of the major terminal 60 is generally resisted via contact between the rectangular portion 76 of the major terminal 60 and the flaps 84 of the major bus bar 62. Put differently, if the base 74 of the major terminal 60 only included the cylindrical portion 72 (e.g., without the rectangular portion 76), torque applied to the post 70 of the major terminal 60 (e.g., applied when coupling leads to the post 70) may cause the post 70 and the base 74 to turn, because the base 74 would not include abutment surfaces that resist rotation of the base 74 within the pocket 65 (e.g., as shown in FIGS. 6 and 7).

During assembly, as previously described, the post 70 may be pushed or extended through the opening 80 in the main body 82 of the major bus bar 62. The flaps 84 may then be stamped or pressed around at least a portion of the base 74 for retaining the base 74, as previously described. For example, an embodiment of the major bus bar 62 and the major terminal 60 during assembly is shown in a perspective view in FIG. 5. In the illustrated embodiment, the post 70 extends through the opening 80 in the main body 82 of the major bus bar 62, and two of the flaps 84 (e.g., not the primary flap 86) are pressed or stamped around the side surfaces 90 of the base 74 of the major terminal 60. For example, after extending the post 70 through the opening 80 in the main body 82 of the major bus bar 62, the assembly may be placed on a flat surface. A pressing mechanism or stamp may stamp the two flaps 84 downwardly from or proximate the top surface 88 of the base 74 around the side surfaces 90 of the base 74 of the major terminal 60. In some embodiments, the flaps 84 may be heated before pressing the flaps in to place around the base 74 of the major terminal 60. Heating the flaps 84 may enable movement of the flaps 84 without negatively affecting the major bus bar 62.

Figure 5:
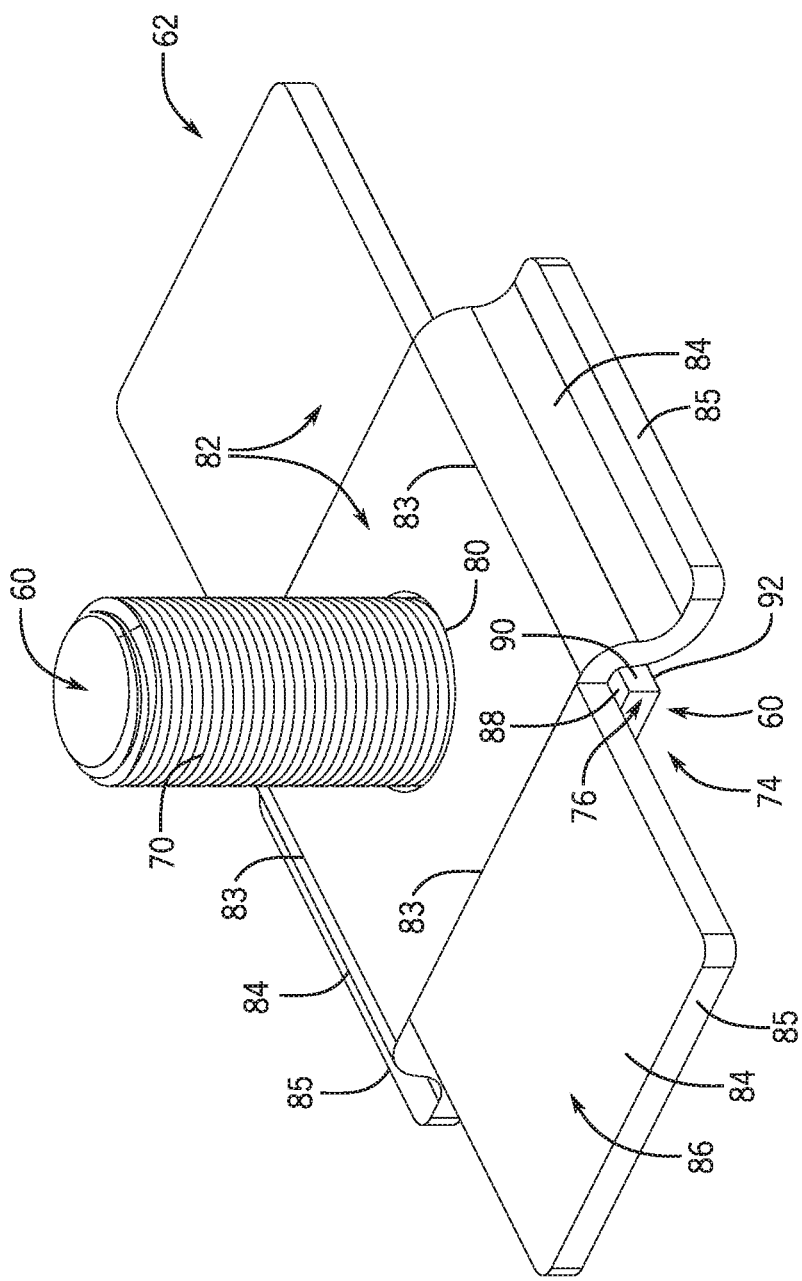
FIG. 5 is a perspective view of an embodiment of a partial assembly of the bus bar and the major terminal of FIG. 4, in accordance with an aspect of the present disclosure.

The embodiment in FIG. 5 is only partially assembled, in accordance with certain embodiments. In some embodiments, the primary flap 86 is also folded around the base 74 to retain the base 74. For example, FIGS. 6 and 7 provide perspective views of embodiments of the major terminal 60 and the major bus bar 62 assembled for installation in the battery module 20 of FIG. 3. For example, in the illustrated embodiments, the primary flap 86 of the three flaps 84 is folded or stamped around the side surface 90 of the base 74 and under the bottom surface 92 of the base 74 of the major terminal 60. As previously described, the primary flap 86 may be heated before folding or stamping to enable the folding or stamping without negatively affecting the major bus bar 62. Further, it should be noted that, in some embodiments, the two other flaps 82 (e.g., not the primary flap 86) may be folded over at least a portion of the bottom surface 92 of the base 74 as well.

Focusing in particular on FIG. 7, the base 74 includes, as previously described, the cylindrical portion 72 coupled to the post 70 and the rectangular portion 76 disposed around the post 70. In some embodiments, the cylindrical portion 72 and the rectangular portion 76 may be aligned such that the bottom surface 92 is flush across the entirety of the base 74 (e.g., both the cylindrical and rectangular portions 72, 76). Further, in other embodiments, the base 74 may only include the rectangular portion 76, as previously described. In the illustrated embodiment, the cylindrical portion 72 extends farther than the rectangular portion 76, such that the bottom surface 92 is not flush across the cylindrical and rectangular portions 72, 76. In such configurations, as illustrated, the primary flap 86 may include a curved edge 100 surrounding a portion of an outer perimeter 102 of the cylindrical portion 72 of the base 74 of the major terminal 60. However, in embodiments with only the rectangular portion 76, the flaps 84 may not include the illustrated curved edge 100 (e.g., may include only substantially straight edges). Alternatively, in embodiments with only the rectangular portion 76, an integrally formed cylindrical bump may extend from the bottom surface 92 of the rectangular portion 76, where the curved edge 100 of the primary flap 86 interfaces with the integrally formed cylindrical bump.

In general, the rectangular portion 76 of the base 74 of the major terminal 60 is included to resist torque applied to the post 70 of the major terminal 60, as previously described. For example, an electrical lead may couple to the post 70 and may enable power transmission from the post 70 to a load coupled to another end of the electrical lead, where the electrical lead may be clamped or screwed onto the post 70, thereby applying torque to the post 70. During coupling of the lead to the post 70, torque may be applied. In accordance with an aspect of the illustrated embodiments, as the torque is applied to the post 70, the post 70 transfers the torque to the rectangular portion 76 of the base 74 coupled to the post 70, and the rectangular portion 76 contacts the major bus bar 62 at the flaps 84 wrapped around the rectangular portion 76 to resist turning of the base 74 (and, thus, turning of the major terminal 60).

Figure 8:
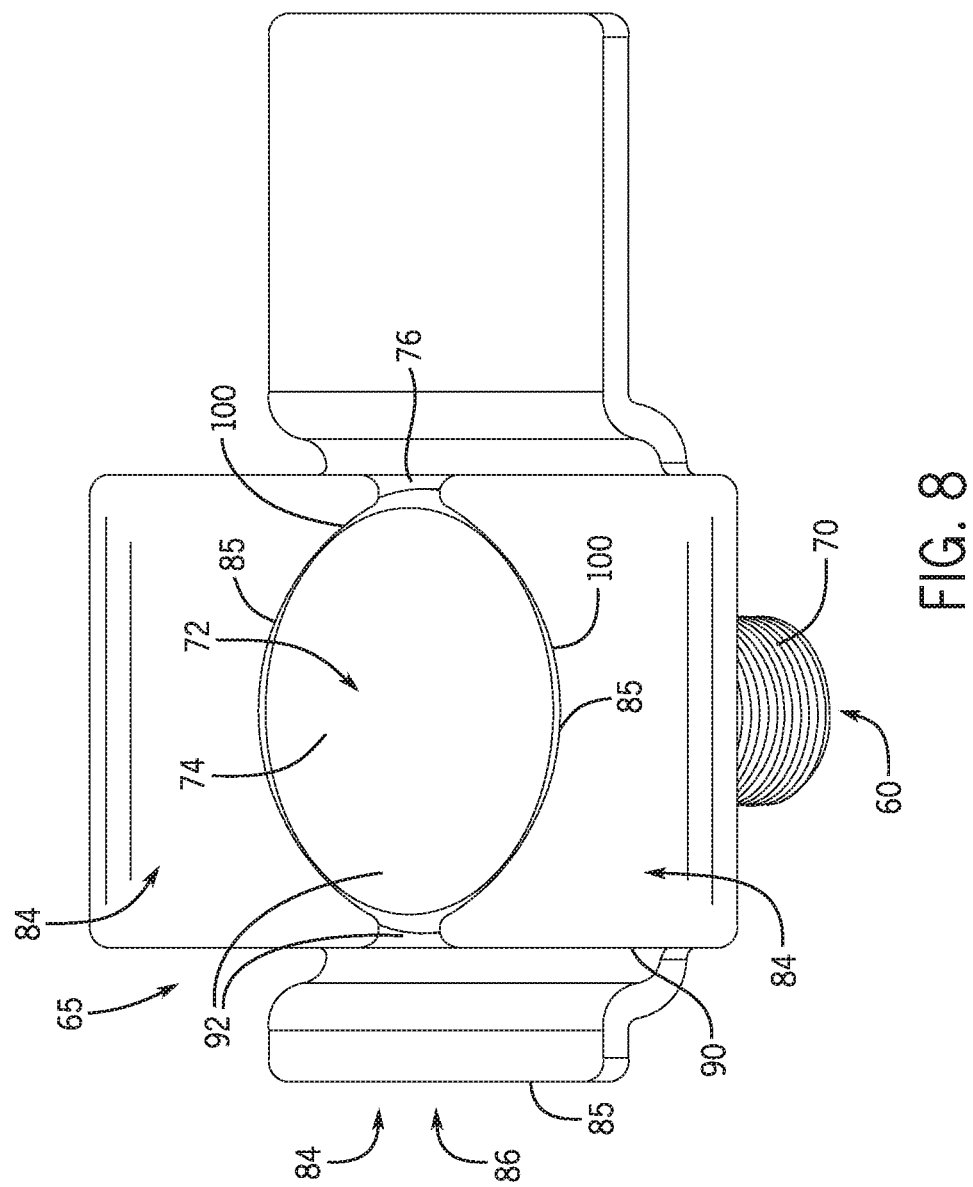
FIG. 8 is a bottom perspective view of an embodiment of the assembly of the bus bar and the major terminal of FIG. 6, in accordance with an aspect of the present disclosure.

It should be noted that any one of the flaps 84 may wrap from a location proximate the top surface 88 of the base 74 to a location proximate the bottom surface 92 of the base 74. For example, another embodiment of the assembled major terminal 60 and major bus bar 62 is shown in FIG. 8, where the primary flap 86 only extends over the side surface 90 of the rectangular portion 76 of the base 74 and the two other flaps 84 extend over the bottom surface 92 of the base 74. The two other flaps 84 wrapped around the bottom surface 92 of the base 74 each include curved edges 100 disposed proximate the outer perimeter 102 of the cylindrical portion 72 (or, in another embodiment, an integrally formed cylindrical bump of the rectangular portion 76).

Figure 9:
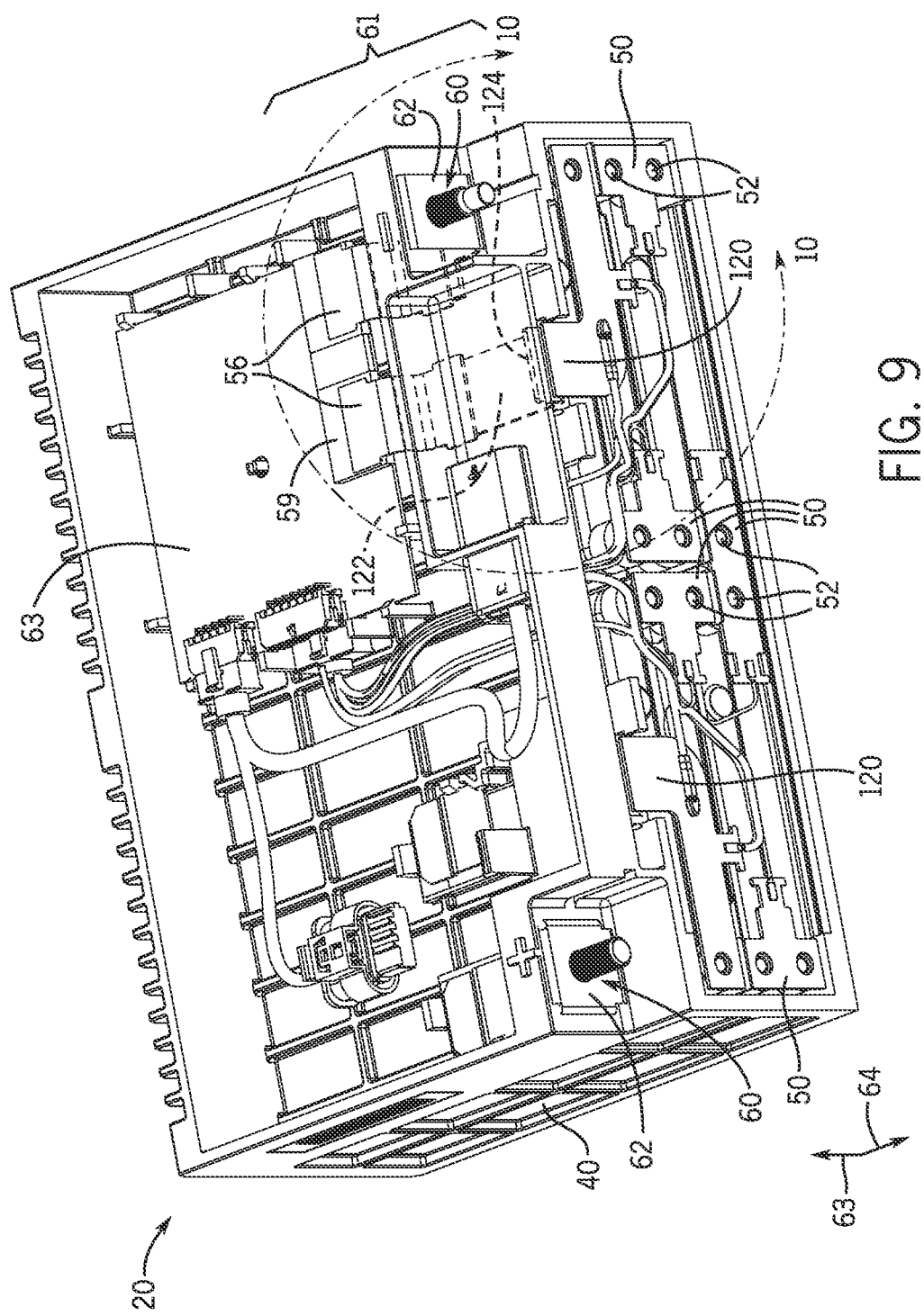
FIG. 9 is a perspective view of an embodiment of a battery module for use in the vehicle of FIG. 1, in accordance with an aspect of the present disclosure.

As previously described with reference to FIG. 3, the electrical path 61 (e.g., having the major bus bar 62) configured to establish electrical communication between the major terminal 60 of the battery module 20 and the minor terminal 48 of the electrochemical cell 42 may include additional or different components depending on, e.g., an orientation of the major terminal 60. For example, a perspective view of an embodiment of the battery module 20 having major terminals 60 extending in direction 64 (e.g., as opposed to direction 63, as shown in FIG. 3) is shown in FIG. 9. In the illustrated embodiment, the carrier 52 is installed on the housing 40 of the battery module 20. Indeed, in some embodiments, the carrier 52 may be nested with the housing 40, where the carrier 52 includes features configured to receive the minor bus bars 50 and the minor terminals 48 of the electrochemical cells 42. In other embodiments, the carrier 52 may snap on to the housing 40 for ease of installation, or the carrier 52 may be fastened, welded, adhesively coupled, or otherwise coupled to the housing 40.

In the illustrated embodiment, and as noted above, the electrochemical cells 42 are coupled in series via the minor bus bars 50 extending between adjacent minor terminals 48 of the electrochemical cells 42. The minor terminals 48 on either end of the aggregate network of interconnected electrochemical cells 42 are electrically coupled to the major terminals 60 via the electrical paths 61, as previously described. However, because the major terminals 60 extend in direction 64 instead of direction 63 (e.g., along the same direction as the cell or minor terminals 48), the electrical paths 61 in the embodiment in FIG. 9 may be different than the electrical paths 61 in the embodiment of FIG. 3.

As one example of the difference between embodiments of FIGS. 3 and 9, the minor terminal 48 on either end of the aggregate network of interconnected electrochemical cells 42 is coupled to a connecting bar 120 that extends from the minor terminal 48 inwardly along the carrier 52 toward another component of the electrical path 61. The connecting bar 120 may be considered a type of bus bar, but for clarity will be referred to herein as the connecting bar 120. The connecting bar 120 may, for example, include a material corresponding to the material of the minor terminal 48 from which it extends (e.g., aluminum). In other words, the material of the connecting bar 120 may be the same material as the minor terminal 48, or a material that, when welded to the minor terminal 48, would not introduce substantial Galvanic effects. The connecting bar 120 is coupled to a bi-metal extension 122 that includes a first end 124 having a first material corresponding to the material of the connecting bar 120, and a second end 126 opposite to the first end 124 and including a second material different than the first material. The second end 126, for example, may be copper, and may couple to the bridge 56 (e.g., copper bridge). The bridge 56 may couple to the shunt 59, which may be coupled to a printed circuit board (PCB 63) as previously described. In the illustrated embodiment, another bridge 56 extends from the shunt 59 and couples to the major bus bar 62 wrapped around the major terminal 60, as previously described. Thus, the illustrated electrical path 61 includes the connecting bar 120 extending from the minor terminal 48, the bi-metal extension 122, the bridge 56, the shunt 59, the other bridge 56, and the major bus bar 62 coupled to the major terminal 60. It should be noted that the two bridges 56 for each of the two electrical paths 61 (e.g., on either end of the battery module 20) may be interchangeable and may also be symmetrical, such that the bridges 56 may be inserted into the electrical path 61 without having to substantially maneuver the bridges 56 to be oriented in a particular direction. In other words, the bridges 56 can be flipped over and rotated 180 degrees and would establish the connection between the shunt 59 and the bi-metal extension 122 in the same manner as shown.

Figure 10:
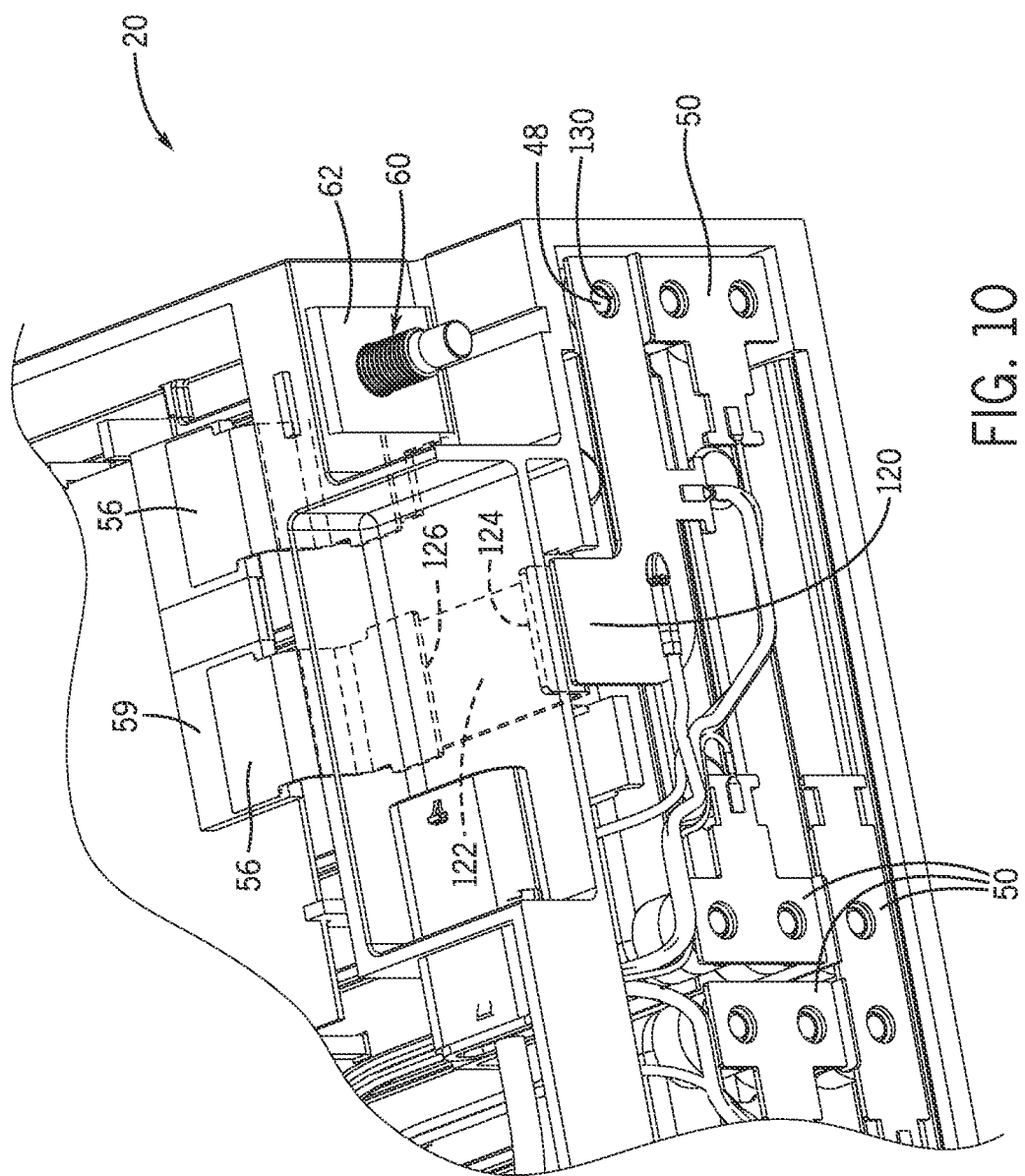
FIG. 10 is a cutout perspective view of a portion of an embodiment of the battery module of FIG. 9 taken along line 10-10, in accordance with an aspect of the present disclosure.

To further illustrate these aspects of the present disclosure, a cut away perspective view of an embodiment of the battery module 20 taken along line 10-10 in FIG. 9 is shown in FIG. 10. As previously described, the connecting bar 120 couples to the minor terminal 48 and to the bi-metal extension 122. The connecting bar 120 may include an opening 130 configured to receive the minor terminal 48, or the connecting bar 120 may press against a top surface of the minor terminal 48 or a top surface of a conductive component (e.g., a ring) surrounding the minor terminal 48. The connecting bar 120 also contacts the first end 124 of the bi-metal extension 122 (e.g., where the connecting bar 120 and the first end 124 include the same material). The second end 126 of the bi-metal extension 122 may include a different material (e.g., copper) corresponding to the bridge 56 to which the second end 126 is coupled (e.g., welded). The bridge 56 couples to the shunt 59 (e.g., via a weld), the shunt 59 couples to the other bridge 56 (e.g., via a weld), and the other bridge 56 couples to the major bus bar 62 (e.g., via a weld) extending from the major terminal 60. The major bus bar 62 may include an additional 90 degree bend (e.g., in the main body 82 of the major bus bar 62 shown in FIGS. 4-8) to couple the major bus bar 62 to the other bridge 56 (e.g., via a weld).

It should be noted that, as previously described, the major bus bar 62 includes one or more flaps, extensions, or members wrapped around the major terminal 60 (e.g., a base thereof) to retain the major terminal 60. In accordance with an aspect of the present disclosure, the major terminal 60 need not be welded to the major bus bar 62. Thus, dissimilar materials may be used for the major terminal 60 and the major bus bar 62 (e.g., stainless steel and copper, respectively). For example, as previously described, the major bus bar 62 may include copper (corresponding to the shunt 59) and the major terminal 60 may include stainless steel (which may be cheaper and may be more readily manufactured than a copper terminal). In general, the above described electrical path 61 includes the particular components and locations of material transition(s) (e.g., from aluminum to copper) for ease of manufacturing. However, in other embodiments, the electrical path 61 may include fewer or more components, or differently shaped components, to accommodate other components and considerations in producing the battery module 20, while still providing electrical communication between the major bus bar 62 and the major terminal 60 without welding the major bus bar 62 and the major terminal 60 together.

Figure 11:
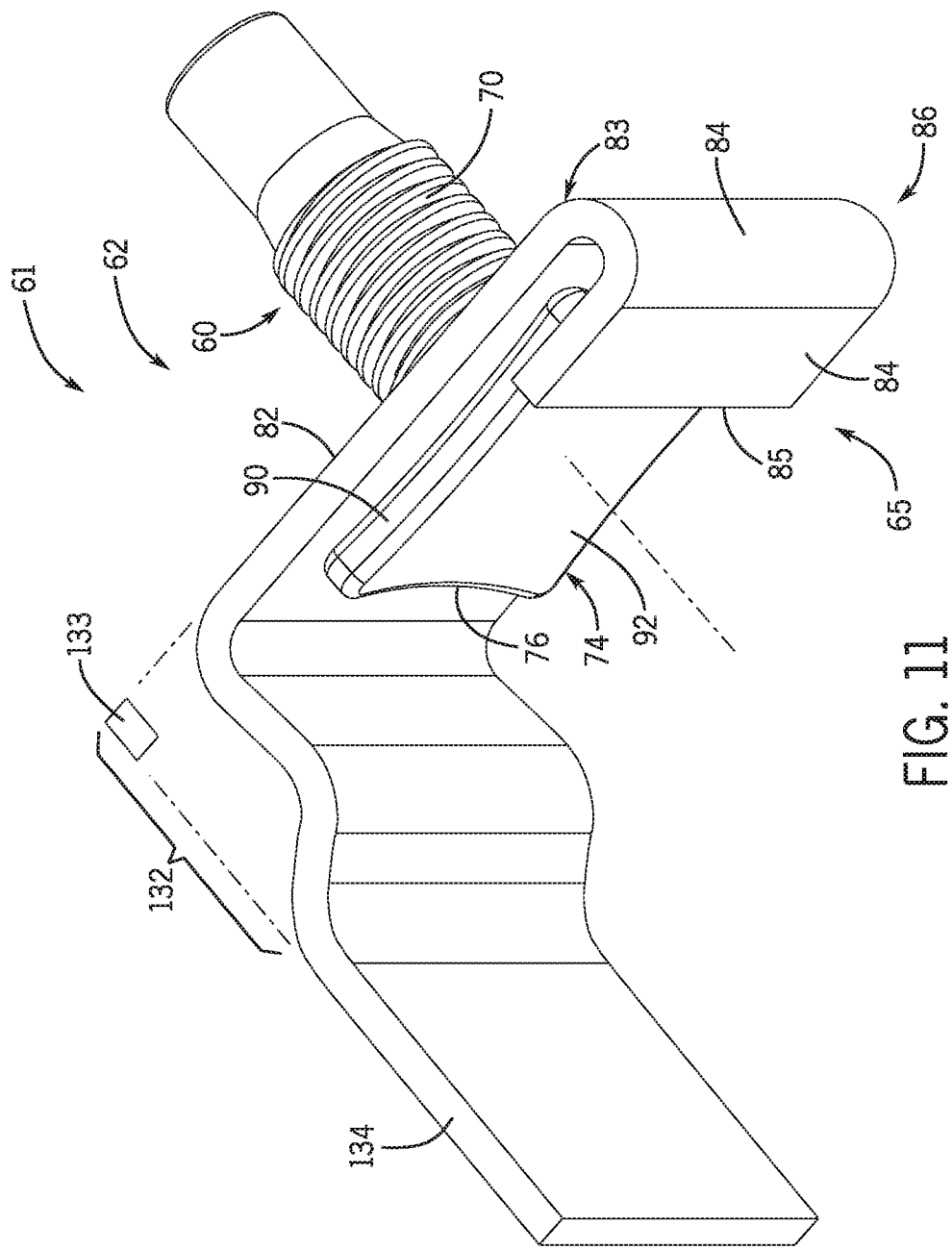
FIG. 11 is a perspective view of an embodiment of an assembly of a bus bar and major terminal, in accordance with an aspect of the present disclosure.

For example, an embodiment of a portion of the electrical path 61 having the major terminal 60 and the major bus bar 62 is shown in a perspective view in FIG. 11. In the illustrated embodiment, the major terminal 60 includes only the rectangular portion 76 (e.g., without the cylindrical portion 72) of the base 74. It should be noted that the rectangular portion 76 may be substantially rectangular, but with slightly curved edges (e.g., as shown in the illustrated embodiment). Further, the major bus bar 62 includes only the primary flap 86 (e.g., of the flaps 84), where the primary flap 86 is wrapped around the side surface 90 of the base 74 and under the bottom surface 92 of the base 74. Thus, in the illustrated embodiment, the pocket 65 that retains the base 74 is formed by the primary flap 86 and the main body 82 above the primary flap 86. As previously described, the primary flap 86 of the major bus bar 62 blocks rotation of the base 74 and, thus, of the major terminal 60 extending through the major bus bar 62.

In the illustrated embodiment, the major bus bar 62 includes a curved portion 132 extending from the main body 82 and an extension 134 extending from the curved portion 132. The curved portion 132 may include one or more curves (e.g., bends) to facilitate coupling of the major bus bar 62 to a component that may be oriented differently than the major bus bar 62. For example, the curved portion 132 may enable coupling of the extension 134 to a component having a face (e.g., surface, side, substrate) that is oriented parallel to the extension 134. In the illustrated embodiment, the curved portion 132 enables an angle 133 of approximately 90 degrees between the main body 82 of the major bus bar 62 and the extension 134 of the major bus bar 62. However, it should be noted that the curved portion 132 may be configured to enable any suitable angle between the main body 82 and the extension 134 to facilitate suitable coupling of the extension 134 to another component of the electrical path 61.

Figure 12:
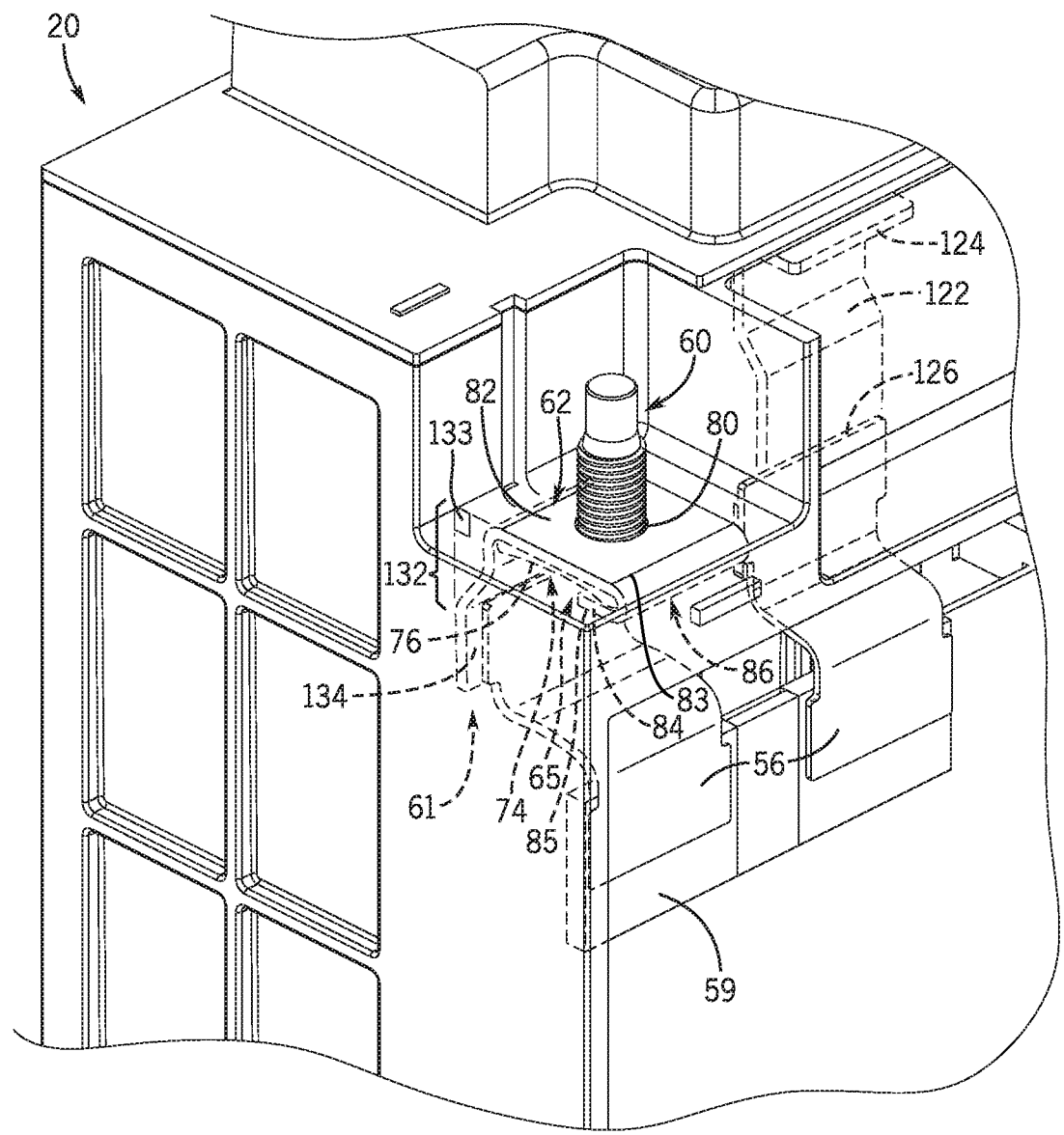
FIG. 12 is a perspective view of an embodiment of a battery module having the assembly of the bus bar and the major terminal of FIG. 11, in accordance with an aspect of the present disclosure.
Figure 13:
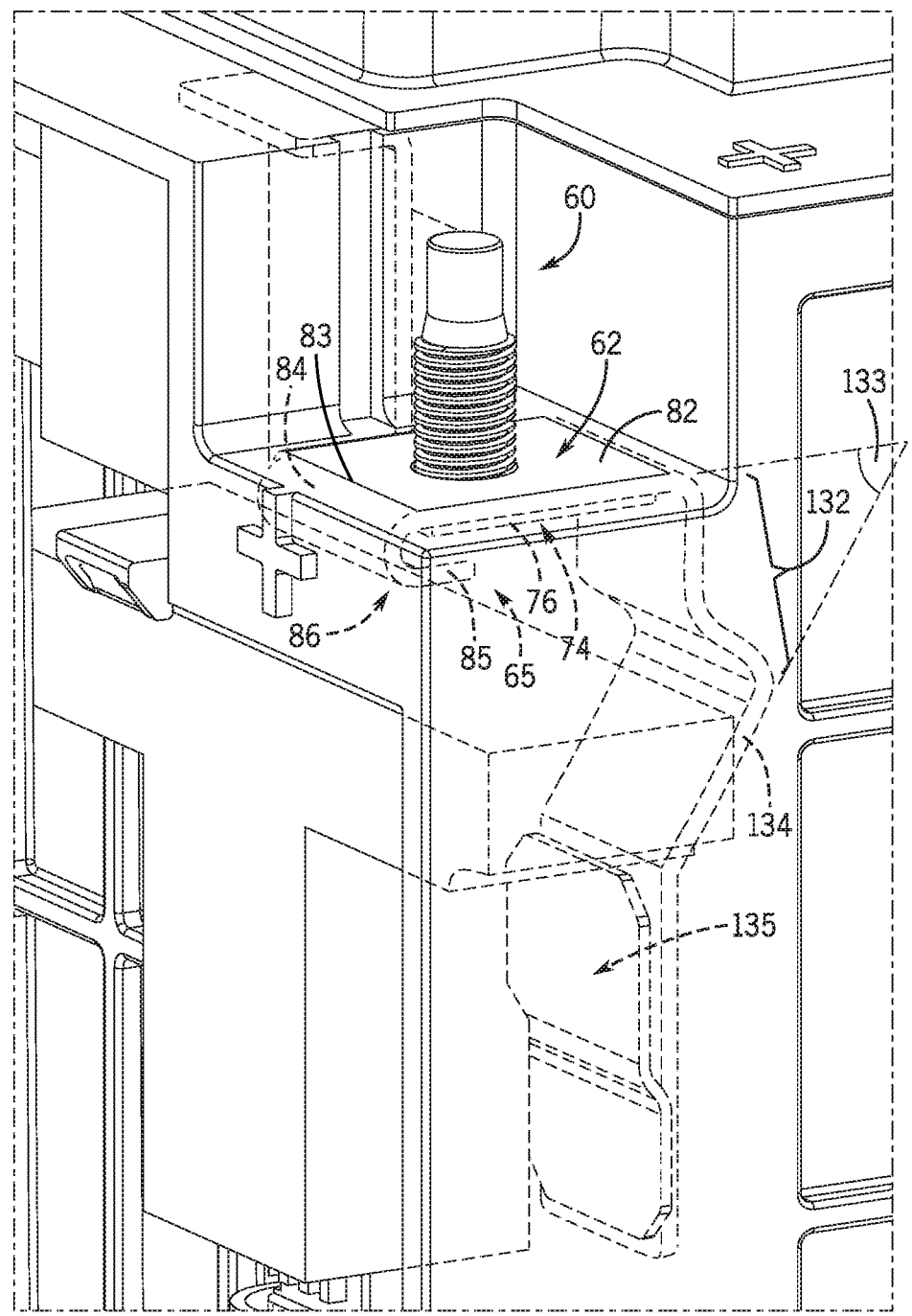
FIG. 13 is a perspective view of an embodiment of a battery module having the assembly of the bus bar and the major terminal of FIG. 11, in accordance with an aspect of the present disclosure.

For example, perspective views of embodiments of the battery module 20 having the electrical path 61 including the major bus bar 62 and the major terminal 60 are shown in FIGS. 12 and 13. Focusing on FIG. 12, the major bus bar 62 includes the main body 82, the curved portion 132, and the extension 134 extending from the curved portion 132. As shown, the curved portion 132 enables approximately the 90 degree angle 133, although, in another embodiment, the angle 133 may be more or less than 90 degrees. The curved portion enables coupling of the major bus bar 62 directly to the bridge 56 of the battery module 20. Thus, in the illustrated embodiment, the electrical path 61 includes at least the major terminal 60, the major bus bar 62 coupled to the major terminal 60, the bridge 56 coupled to the extension 134 of the major bus bar 62, the shunt 59, and the other bridge 56 coupled to the shunt 59. The electrical path 61 may also include other components such that the electrical path 61 extends from the major terminal 60 to one of the minor terminals (not shown) of one of the electrochemical cells (not shown) disposed in the battery module 20.

Focusing on FIG. 13, the major bus bar 62 includes the main body 82, the curved portion 132, and the extension 134 extending from the curved portion 132. However, in the illustrated embodiment, the curved portion 132 enables a different angle 133 between the extension 134 and the main body 82 of the major bus bar 62. For example, the angle 133 may be approximately 60 degrees. However, in other embodiments, the angle 133 may be 10-110 degrees, 30-90 degrees, 50-70 degrees, or 55-65 degrees. The curved portion 132 generally enables the angle 133 such that the extension 134 couples to a component 136 (e.g., bridge, bus, bus bar, connecting bar, contact, shunt) of the electrical path 61 that is substantially parallel to the extension 134. However, in certain embodiments, the component 136 may not be substantially parallel to the extension 134, but the curved portion 132 may enable the angle 133 to facilitate positioning of the extension 134 proximate to the component 136. It should be noted that the curved portion 132, and any other portion of the major bus bar 62 (e.g., the flaps 84, the primary flap 86, the extension 134), may be manufactured by stamping the major bus bar 62, heating and bending the major bus bar 62, deep drawing the major bus bar 62 (e.g., via a cold formed process), a combination thereof, or any other suitable manufacturing means.

Figure 14:
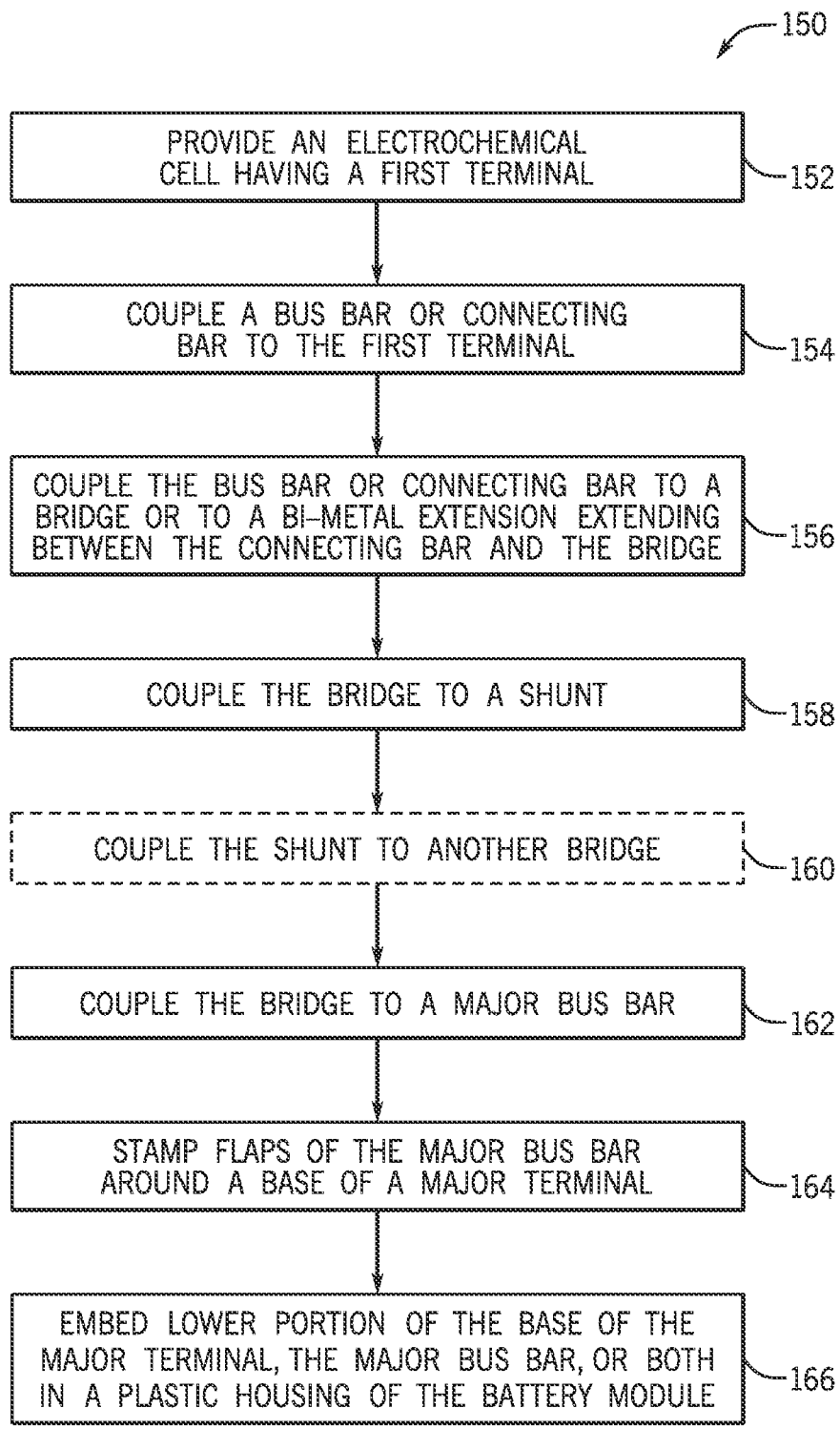
FIG. 14 is a process flow diagram of a method of manufacturing or assembling the bus bar and the major terminal of FIG. 4, in accordance with an aspect of the present disclosure.

Turning now to FIG. 14, a process flow diagram of a method 150 of assembling the electrical path 61 is shown. The method 150 includes providing the electrochemical cell 42 having the first terminal 48 (block 152). For example, the electrochemical cell 42 may be a top or bottom cell in the stack 44 of electrochemical cells 42, as previously described. The electrochemical cells 42 in the stack 44 may be electrically interconnected to generate a charge for powering a load. Thus, the charge generated by the stack 44 of electrochemical cells 42 travels to and through the first terminal 48 described above.

The method 150 also includes coupling the minor bus bar 50 or the connecting bar 120 to the first terminal 48 (block 154). Depending on the particular configuration of the battery module 20, the minor bus bar 50 may be a bi-metal bus bar for transitioning from a first material corresponding to the material of the first terminal 48 to a second material different from the first material. Alternatively, the connecting bar 120 may include only one material corresponding to the material of the first terminal 48.

The method 150 further includes coupling (e.g., welding) the minor bus bar 50 or the connecting bar 120 to the bridge 56 or to an intervening component (e.g., a bi-metal extension 122) (block 156). For example, if the minor bus bar 50 is a bi-metal bus bar, the minor bus bar 50 may connect directly to the bridge 56. If the connecting bar 120 is used, the bi-metal extension 122 may be included to transition to a different material corresponding to the material of the bridge 56 (e.g. copper). The bridge 56 may then be coupled with the bi-metal extension 122.

Further, the method 150 includes coupling (e.g., welding) the bridge 56 to a shunt 59 (block 158). The shunt 59 generally includes a material that enables voltage and/or temperature sensing at the shunt 59 (e.g., copper). Thus, the previously described material transition (e.g., from aluminum to copper) facilitates the use of copper for the shunt 59.

Further still, the method 150 includes coupling (e.g., welding) the shunt 59 to another bridge 56 (block 160). It should be noted that step 160 may not be utilized in certain embodiments. For example, in certain embodiments, the shunt 59 may be sandwiched between one bridge 56 and the major bus bar 62 of the battery module 20, thereby rendering an additional bridge 56 unnecessary. However, in the illustrated method 150, the first bridge 56 is coupled to the shunt 59, and the shunt 59 is coupled to the second bridge 56.

The method 150 also includes coupling (e.g., welding) the bridge 56 (e.g., the second bridge 56) to the major bus bar 62, as previously described (block 162). The method 150 also includes folding, stamping, or otherwise maneuvering flaps 84 or extensions of the major bus bar 62 around the base 74 of the major terminal 60 of the battery module 20 (block 164). The flaps 84 may be folded around the base 74 by heating and bending the flaps 84, or via a cold formed process (e.g., deep drawing).

Further still, the method 150 includes embedding a lower portion of the base 74 of the major terminal 60, of the major bus bar 62, or of both, in a wall of the plastic housing 40 of the battery module 20. As previously described, the lower portion may be embedded in the housing 40 such that the post 70 of the major terminal 60 extends vertically, horizontally, or otherwise, with respect to, e.g., the stacks 44 of the electrochemical cells 42.

One or more of the disclosed embodiments, alone or in combination, may provide one or more technical effects useful in the manufacture of battery modules, and portions of battery modules. In general, embodiments of the present disclosure include a battery module with a major terminal and major bus bar coupled together without welding, e.g., by folding or stamping flaps or extensions of the major bus bar around a base of the major terminal Retaining the major terminal by folding the flaps or extensions of the major bus bar around a base of the major terminal, as opposed to welding the two components together, enables dissimilar materials to be used for the major bus bar and the major terminal, thereby reducing a material cost of the battery module. Further, utilizing dissimilar materials may enable embedding of the major bus bar, the major terminal, or portions of both within a housing of the battery module, thereby reducing a volume devoted to the major bus bar and the major terminal such that an energy density of the battery module is increased. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module, comprising:
an electrochemical cell having a minor terminal;
a major terminal electrically coupled to the minor terminal of the electrochemical cell by an electrical path, wherein the major terminal comprises a screw-like shape and an electrically conductive material consisting essentially of a base and a post extending from the base; and
a bus bar of the electrical path, wherein the bus bar comprises a main body having an opening disposed through the main body, wherein the post of the major terminal extends through the opening which entirely surrounds a circumference of the post, wherein the bus bar comprises a first flap having a proximal end attached to, and extending from, the main body of the bus bar, wherein the first flap comprises a distal free end disposed opposite to the proximal end, wherein the first flap comprises a curvature between the proximal end and the distal free end such that the curvature extends about a portion of a side surface of the base of the major terminal, and wherein the first flap restrains rotation of the base of the major terminal via direct contact between the first flap and the side surface of the base.

2. The battery module of claim 1, wherein the bus bar comprises a second flap having an additional proximal end attached to and extending from the main body of the bus bar, wherein the second flap comprises an additional distal free end disposed opposite the additional proximal end, and wherein the second flap comprises an additional curvature between the additional proximal end and the additional distal free end such that the curvature extends about another portion of the side surface of the base of the major terminal, and wherein the first flap and the second flap restrain rotation of the base of the major terminal via contact between the side surface of the base and the first and second flaps.

3. The battery module of claim 2, wherein the first flap extends from a first side of the main body of the bus bar, and wherein the second flap extends from a second side of the main body of the bus bar opposite to the first side.

4. The battery module of claim 1, wherein the base comprises a rectangular portion.

5. The battery module of claim 4, wherein the base comprises a cylindrical or circular portion disposed within an opening in the rectangular portion.

6. The battery module of claim 1, wherein the bus bar comprises:
a curved portion extending from the main body; and
an extension extending from the curved portion, wherein the curved portion enables an angle between the extension and the main body to position the extension proximate to a component of the electrical path configured to be coupled to the extension.

7. The battery module of claim 1, wherein the post is integrally formed with the base.

8. The battery module of claim 1, wherein the electrically conductive material of the major terminal is a first electrically conductive material and the bus bar comprises a second electrically conductive material different than the first electrically conductive material.

9. The battery module of claim 8, wherein the first material is copper or the second material is stainless steel.

10. The battery module of claim 8, wherein the electrical path comprises:
a bi-metal bus bar having a first metal portion coupled to the minor terminal of the electrochemical cell; and
a bridge in electrical communication with, and extending between, the bus bar and a second metal portion of the bi-metal bus bar, wherein the first metal portion comprises a third material and the second metal portion comprises the second material.

11. The battery module of claim 8, wherein the electrical path comprises:
a connecting bar coupled to, and extending from, the minor terminal of the electrochemical cell;
a bi-metal extension and a first metal portion of the bi-metal extension coupled to, and extending from, the connecting bar;
a first bridge coupled to, and extending between, a second metal portion of the bi-metal extension and a shunt; and
a second bridge coupled to, and extending between, the shunt and the bus bar, wherein the first bridge, the second bridge, the shunt, and the second metal portion of the bi-metal extension are formed of the second material and wherein the first metal portion of the bi-metal extension and the connecting bar are formed of a third material.

12. The battery module of claim 1, wherein the major terminal and the bus bar are coupled together without welds.

13. The battery module of claim 1, wherein the electrochemical cell comprises a prismatic electrochemical cell, a lithium-ion electrochemical cell, or a combination thereof.

14. A battery module, comprising:
a first electrochemical cell having a first terminal, a second electrochemical cell having a second terminal, and one or more intermediate electrochemical cells electrically connected between, and to, the first electrochemical cell and the second electrochemical cell;
a first electrical path extending between the first terminal of the first electrochemical cell and a first major terminal of the battery module, wherein the first electrical path comprises a first major bus bar, wherein the first major terminal comprises a first screw-like shape and a first electrically conductive material consisting essentially of a first post that extends through a first opening in a first main body of the first major bus bar, the first opening entirely surrounding a circumference of the first post, and a first base that is coupled to the first post and retained within a first pocket of the first major bus bar, wherein the first pocket of the first major bus bar comprises a first bus bar flap having a first proximal end attached to, and protruding from, the first main body and having a first distal free end opposite to the first proximal end, wherein a first curvature of the first bus bar flap extends about a first side surface of the first base of the first major terminal and between the first proximal end and the first distal free end, and wherein the first flap restrains rotation of the first base of the first major terminal via direct contact between the first flap and the first side surface of the first base; and a second electrical path extending between the second terminal of the electrochemical cell and a second major terminal of the battery module, wherein the second electrical path comprises a second major bus bar, wherein the second major terminal comprises a second screw-like shape and a second electrically conductive material consisting essentially of a second post that extends through a second opening in a second main body of the second major bus bar, the second opening entirely surrounding a circumference of the second post, and a second base that is coupled to the second post and retained within a second pocket of the second major bus bar, wherein the second pocket of the second major bus bar comprises a second bus bar flap having a second proximal end attached to, and protruding from, the second main body and having a second distal free end opposite to the second proximal end, wherein a second curvature of the second bus bar flap extends about a second side surface of the second base of the second major terminal and between the second proximal end and the second distal free end, and wherein the second flap restrains rotation of the second base of the second major terminal via direct contact between the second flap and the second side surface of the second base.

15. The battery module of claim 14, comprising a plastic housing that houses the first electrochemical cell, the second electrochemical cell, and the one or more intermediate electrochemical cells, wherein the first base, the second base, at least a first portion of the first major bus bar, at least a second portion of the second major bus bar, or a combination thereof is embedded within the plastic housing.

16. The battery module of claim 14, wherein the first major bus bar and the second major bus bar comprise a third material, and wherein the first electrically conductive material of the first major terminal and the second electrically conductive material of the second major terminal are different than the third material.

17. The battery module of claim 14, wherein the first base comprises a first rectangular portion and the second base comprises a second rectangular portion.

\* \* \* \* \*

UNITED STATES PATENT AND TRADEMARK OFFICE
CERTIFICATE OF CORRECTION

PATENT NO. : 10,673,050 B2
APPLICATION NO. : 14/620113
DATED : June 2, 2020
INVENTOR(S) : Mack et al.

It is certified that error appears in the above-identified patent and that said Letters Patent is hereby corrected as shown below:

In the Specification

1. In Column 2, Line 67, delete "terminal" and insert -- terminal. --, therefor.

2. In Column 3, Line 23, delete "terminal The" and insert -- terminal. The --, therefor.

3. In Column 3, Line 33, delete "terminal" and insert -- terminal. --, therefor.

4. In Column 5, Line 29, delete "terminal Generally," and insert -- terminal. Generally, --, therefor.

5. In Column 5, Line 44, delete "terminal" and insert -- terminal. --, therefor.

6. In Column 5, Line 50, delete "terminal Further" and insert -- terminal. Further --, therefor.

7. In Column 5, Line 64, delete "terminal These" and insert -- terminal. These --, therefor.

8. In Column 6, Line 40, delete "thereof Illustratively," and insert -- thereof. Illustratively, --, therefor.

Signed and Sealed this
Thirty-first Day of January, 2023

Katherine Kelly Vidal
*Director of the United States Patent and Trademark Office*